Patented Nov. 17, 1936

2,060,928

UNITED STATES PATENT OFFICE 2,060,928

MATERIAL FOR MAKING CLOSURE LINERS

Frederick M. Damitz, Irvington, N. J., assignor to Irvington Varnish & Insulator Co., Irvington, N. J., a corporation of New Jersey No Drawing. Application September 13, 1933, Serial No. 689,264

4 Claims. (Cl. 91—70)

This invention relates, generally, to liners for receptacle closures, and the invention has reference more particularly to a novel coating composition or material for use in making closure liners and for similar uses, where a tasteless, odorless, non-tacky, moisture, solvent and solution resistant material is desired.

Liners heretofore used have not been entirely satisfactory for various reasons, varying in accordance with the ingredients used in preparing the liners. Plain cork, unless natural cork, contaminates products due to the binder present. Natural cork is too expensive and also cannot be employed in connection with many products because of its porosity. Plain pulpboards develop odor in use, are subject to mold growth and are not impervious to moisture and vapors. Waxed boards, while useful in connection with aqueous solutions, greases, etc., cannot be made with some products containing oils and other wax solvents, nor can they be used where high temperatures are involved as in pasteurization processes. Various foils, plain and duplexed, are used extensively, but foils are objected to because of their cost and because of their solubility in acids, alkalies and medical preparations. Shellac is desirable because the same is substantially tasteless and odorless but it cannot be used where pasteurization processes are involved because it becomes tacky in the presence of heat, nor can it be used when heat and pressure is applied as when adhering the spot in spot crowns. The coating of liners with shellac has been done at relatively low temperature in the past and if the material is cured at higher temperatures, difficulty is experienced in coating and considerable excess plasticizer has to be used to obtain a liner with enough resilience for use with caps. In adding the excess plasticizer the material becomes tacky and the sweating out of the plasticizer results with the production of some odor.

The principal object of the present invention is to provide a novel liner material employing a resin, such as shellac, that is blended with other ingredients and cured into a different form so that the resultant coating material of this invention is substantially insoluble in various solutions and solvents, is flexible, non-tacky, odorless and tasteless and is not softened by heat treatment or appreciably affected by acids and alkalies.

Another object of the present invention lies in the provision of a liner material of the above character that may be cheaply manufactured, is clean and attractive in appearance and has an extensive field of use.

Other objects of this invention, not at this time more particularly enumerated, will be clearly understood from the following detailed description of the same.

In carrying out my invention I preferably use shellac as the basis of the coating. The shellac in powdered form is first dissolved in a suitable solvent such as alcohol and then is converted into an enamel by mixing with pigment and filler and grinding in a burr stone or other suitable mill. To this enamel is added a suitable plasticizer such as tricresyl phosphate, thereby preparing the material for coating. The material may be applied as it is or the same may be thinned as by the use of additional alcohol. After applying the coating material to the base material such as calendered paper, the coated paper is baked in an oven at a temperature of approximately 280° F. for a suitable time and then cured at approximately 300° for a desired period. The curing of the coating at this high temperature changes the physical and chemical nature of the coating and renders the same heat resisting as well as increasing the resistance of the coating to chemicals and moisture.

As a specific example of the coating composition of this invention, the following ingredients are employed in the proportions given by weight:

| | Parts |
|---|---|
| Shellac | 28 |
| Alcohol (shellacol) | 48 |
| "Titanox" | 48 |
| Asbestine | 10 |
| Tricresyl phosphate | 14 |

This specific example of the material of the invention may be prepared by dissolving 148 pounds of bone dry, bleached, refined, powdered shellac in 36 gallons of shellacol (commercial name given to a special denatured alcohol). This may be accomplished by use of any suitable mixing means such as a tumbling barrel or enclosed mixer. After the shellac is dissolved, it is prepared into an enamel by inserting 10 gallons of the above shellac-alcohol solution, together with 48 pounds of "Titanox" (approximately 25% titanium dioxide and 75% barium sulphate) and 10 pounds of asbestine into a burr stone mill, porcelain lined ball mill or the like and grinding the mass. To the enamel thus formed is added with mixing 14 pounds of tricresyl phosphate, thereby producing the novel coating composition.

This coating composition may be applied in any well known way to the paper or other base used for making the liner material. If the coating composition is to be applied by roller coating, the finished batch of coating composition as obtained above is thinned with 2½ gallons of alcohol (shellacol) and coated at this consistency. The number of coats applied will depend upon the desired thickness of the finished product and upon the thickness of the base paper. For example, if a finished coated paper of 5 to 5¼ mil thickness and coated on one side only is desired, then a 4 to 4¼ mil base super calendered paper is used. This base paper is given two coats of the coating material. After each coat is applied, the coated paper is passed through a vertical, horizontal or other type tower or oven for 40 minutes, the interior of the tower or oven being maintained at approximately 280° F., thereby evaporating the solvent from the coating composition and also partially curing the coating material. After the coat or coats have been applied and the coated material thusly oven dried, the material is further cured by keeping the same for approximately one half hour in an oven maintained at approximately 300° F. This curing process serves to favorably alter the physical and chemical nature of the coating, rendering the same highly heat resistant so as to be unaffected by pasteurization or other heat and/or pressure processes. The coated material thus produced is then run through a slitting and stamping mechanism which slits the sheet material and stamps out the liners of the desired diameter.

The liners thus produced are relatively light in weight and have a highly attractive white appearance. They are moisture and heat resistant and are not appreciably affected by acids and bases. These liners possess the desired flexibility for conforming to the mouths of bottles and other containers and are substantially tasteless and odorless.

The coating material of this invention need not ordinarily be thinned when it is applied by spray coating. When applied by dip and flow additional thinner, for example, alcohol is added. For knife coating, a heavier paste is necessary and the shellac alcohol mixture is made up of 148 lbs. of shellac and 25 gallons of alcohol (shellacol) instead of using 36 gallons of alcohol with the same quantity of shellac as previously described. The proportions of pigment, filler and plasticizer remain the same as in the original preparation.

If desired, instead of using bleached shellac I may use orange shellac or T. N. shellac, etc., in preparing the coating material. Also, instead of using shellacol, i. e., denatural alcohol as the shellac solvent, I may also use methyl alcohol or the higher boiling point alcohols, esters and coal tar solvents. Thus: instead of using all alcohol as the shellac solvent I may use a solvent mixture consisting of 70% alcohol (denatured) and 30% amyl alcohol. The amyl alcohol causes the coating composition to flow more in the vertical or horizontal tower or oven before setting, since the higher boiling amyl alcohol does not leave the film as soon as the denatured alcohol, and a more perfect film is produced, the same having substantially no blow holes, pimples or sis marks.

The use of extenders with the alcohol while not appreciably impairing the solubility of the shellac, nevertheless, greatly reduces the cost of the solvent and also serves to delay the rate of drying of the composition, thereby producing a smoother and more uniform film. For example, in making my composition, instead of using 36 gallons of alcohol (shellacol) for dissolving the shellac, I may use a mixture consisting of 25 gallons of alcohol (shellacol) and 11 gallons of (varsol) a petroleum hydrocarbon having a distillation range of 310° F. to 620° F. Of course, when higher boiling solvents and extenders are used with the alcohol, the evaporation or drying period of the coated paper should be prolonged somewhat so that instead of drying a coat for 40 minutes, I may extend this period to an hour or even more. Also I may dry at a temperature higher than 280° in these instances.

Although I prefer to use tricresyl phosphate as a plasticizer I do not wish to limit myself to this material as I can use others with satisfactory results. For example, I may use acetine, dibutyl phthalate, dibutyl lactate, diethyl lactate, A. A. castor oil and castor oil derivatives. Likewise other pigments and fillers may be used in lieu of "Titanox" and asbestine. For example, I may use zinc oxide, zinc sulphide or antimony oxide as a pigment and silica, magnesium carbonate or aluminum hydrate as a filler.

If it is desired to give the liner a lubricated finish, enabling the same to seat itself on the lip of a jar with great ease, the finished liner material may be given a coating of a 5% solution of petrolatum in "varsol" and then baked at 280° F. for one hour. This gives the material a lubricated, though not a greasy finish. A lubricated finish may also be obtained by using other greases and waxes, the percentages of the latter being adjusted to insure lubrication but to avoid a greasy surface.

The novel pigmented product of this invention gives a pleasing appearance to the liners made therefrom and the white color denotes sanitation. The pigment and filler distributes and absorbs the shellac so that heat and pressure have no effect on the material and the same does not become tacky. The pigment and filler used also helps to plasticize the vehicle or shellac and enables more economy in coating without a recovery system in that it is not necessary to thin excessively to avoid waves, pimples and blisters. Also, the presence of the pigment and filler enables the shellac to be cured at high temperature into a new form which is far more insoluble, harder and tougher than heretofore known, and yet the finished product, owing to the relatively large percent of plasticizer used is flexible and resilient. The presence of the pigment and filler also aids in minimizing odor by enabling the passage of volatiles to the surface of the film during coating owing to the dispersive value of the pigment and filler.

The finished liner material may be given a simulated metal foil finish if desired by the following method. The coating material is prepared and applied as previously described but instead of baking the last applied coat for 40 minutes at 280° F. this last coat is baked only approximately 5 minutes at 250° F. i. e., the last coat is baked long enough to drive off the solvent and set the film so that the latter will not be rubbed off in a later rubbing and polishing operation. Then powdered metal, such as aluminum powder or tin powder is dusted upon the coated surface. This surface is then rubbed and polished. This rubbing and polishing is preferably done on a rewinding machine employing revolving brushes. Relatively stiff brushes are used for the rubbing operation and relatively soft brushes are used for polishing. After the rubbing and polishing operations, the material is cured by baking for an hour at approximately 300° F. thereby producing a foil finish that is cheaper than foil itself and one that is not so readily attacked by solvents and solutions owing to the immersion of the metal particles into the coating material.

Instead of using powdered metals, I may use powdered talc, mica or the like, thereby obtaining varying finishes. Also, instead of using my coating composition for the last coat, I may use clear shellac plasticized to the same extent as my composition, the shellac coat being baked for a few minutes and then dusted with the desired metal or other powder and thereafter rubbed and polished. In this case, the earlier applied coat or coats of my pigmented composition serve to give the liner material the desired body upon, which the final shellac coat is carried. The metal or other powder dusted upon the shellac top coat enables a greater amount of plasticizer to be used with the shellac than would otherwise be possible, the powder serving as a protective layer for the highly plasticized shellac and preventing tackiness, as well as sealing in the small amount of odor which may come from the excess plasticizer.

Instead of using shellac as the base or vehicle of my coating composition, I have found from a long series of experiments that other resins, namely, phenol formaldehyde oil soluble, heat reactive resins may be used by suitably adjusting the proportion of plasticizer.

As a specific example of this form of the coating composition, I dissolve 148 pounds of Bakelite resin #2967 in 34 gallons of Xylol (Xylene) plasticized with 56 pounds of tricresyl phosphate. A tumbling barrel may be used for dissolving the resin, or the resin and plasticized Xylol may be put into a kettle and heated to dissolve the resin. The proportions of filler and pigment used with the shellac—solvent—plasticizer mixture previously described may also be used when employing Bakelite resin instead of shellac. After applying the resultant coating material it is preferably cured at 280° F. to a more insoluble stage. The liner material so produced has essentially the same desirable qualities possessed by my first described material.

While I have described herein the preferred embodiments of the invention, as prescribed by the patent statutes, the broader aspects of the invention are not so limited, and I desire, therefore, that the above description be considered as merely illustrative of the invention, and that the various modifications to which the invention is susceptible be included with the scope of the appended claims.

I claim:

1. The method of making a liner for closures having a base and a coating material applied to said base consisting of intermixing a resin of the group consisting of shellac and phenol formaldehyde oil soluble resin with a solvent, a plasticizer and a filler, applying said mixture as a coating to the base and then baking and curing said coating at relatively high temperatures of between 250° to 300° F.

2. The method of making a liner for closures having a base and a coating material applied to said base consisting of intermixing a resin of the group consisting of shellac and phenol formaldehyde oil soluble resin with a solvent, a plasticizer and a filler, applying said mixture as a coating to the base, heating for a short period to drive out volatiles, dusting a powder upon the exposed surface of said coating, and then curing said coating at a relatively high temperature of between 250° to 300° F.

3. The method of making a liner for closures having a base and a coating material applied to said base consisting of intermixing a resin of the group consisting of shellac and phenol formaldehyde oil soluble resin with a solvent, a plasticizer and a filler, applying said mixture as a coating to the base, heating for a short period to drive out volatiles, dusting a metallic powder upon the exposed surface of said coating, polishing the layer of metallic powder thus formed, and then curing said coating at approximately 300° F.

4. The method of making a liner for closures having a base and a coating material applied to said base consisting of intermixing a resin of the group consisting of shellac and phenol formaldehyde oil soluble resin with a solvent, a plasticizer and a filler, applying said mixture as a coating to the base, then baking and curing said coating at relatively high temperatures of between 250° to 300° F., then applying a lubricating film covering the said baked coating, and then again baking said coating at a temperature of approximately 280° F.

FREDERICK M. DAMITZ.